United States Patent [19]

Ryan

[11] Patent Number: 4,540,919
[45] Date of Patent: Sep. 10, 1985

[54] METHOD AND APPARATUS FOR AUTOMATICALLY CONTROLLING HIGHLIGHT EFFECTS

[75] Inventor: John O. Ryan, Cupertino, Calif.

[73] Assignee: Ampex Corporation, Redwood City, Calif.

[21] Appl. No.: 338,194

[22] Filed: Jan. 8, 1982

[51] Int. Cl.³ .............................................. H01J 29/52
[52] U.S. Cl. .................................... 315/384; 358/223; 315/381
[58] Field of Search ................ 358/223, 219; 315/381, 315/383, 384

[56] References Cited

U.S. PATENT DOCUMENTS

| | | | |
|---|---|---|---|
| 3,955,116 | 5/1976 | van den Berg | 358/219 X |
| 3,999,011 | 12/1976 | Sato et al. | 358/219 |
| 4,097,901 | 6/1978 | Peters | 358/223 |
| 4,141,043 | 2/1979 | Liu | 358/219 |
| 4,143,305 | 3/1979 | Gibson et al. | 358/223 |
| 4,149,110 | 4/1979 | Dallos | 358/219 X |
| 4,166,281 | 8/1979 | Dischert et al. | 358/219 |
| 4,229,767 | 10/1980 | Ryan | 358/219 |
| 4,237,491 | 12/1980 | Olson et al. | 358/223 |
| 4,249,215 | 2/1981 | Himmelbauer | 358/223 |
| 4,379,310 | 4/1983 | Bendell | 358/223 X |
| 4,380,028 | 5/1983 | Pepin | 358/219 |

FOREIGN PATENT DOCUMENTS

| 2029876 | 6/1970 | Fed. Rep. of Germany | 358/223 |
|---|---|---|---|
| 0090185 | 7/1980 | Japan | 315/381 |

OTHER PUBLICATIONS

Childress et al., IBM Disclosure; CRT Light Output Enhancement Technique, vol. 13, No. 5, Oct.1970.
J. H. T. Van Roosmalen, 4th Symp. on Photoelectronic Image Devices, vol. 28A, 1969, "Adjustable Saturation in a Pick-Up Tube with Linear Light Transfer Characteristics".
"New Technological Development in Camera Tubes", 6th T.V. Symp., Montreux, Switzerland, May 19-23, 1969.

Primary Examiner—Theodore M. Blum
Assistant Examiner—Brian Scott Steinberger
Attorney, Agent, or Firm—George B. Almeida; Joel D. Talcott

[57] ABSTRACT

During the horizontal retrace scan period of a scanning beam in a television pickup tube, the beam current is increased to the maximum possible value to recharge the target layer, and the cathode voltage is raised by a few volts to prevent readout of normal video. Also, the scanning beam path may be modified to insure that every area of the image is scanned by the retrace scan prior to being scanned by the active picture scan.

11 Claims, 3 Drawing Figures

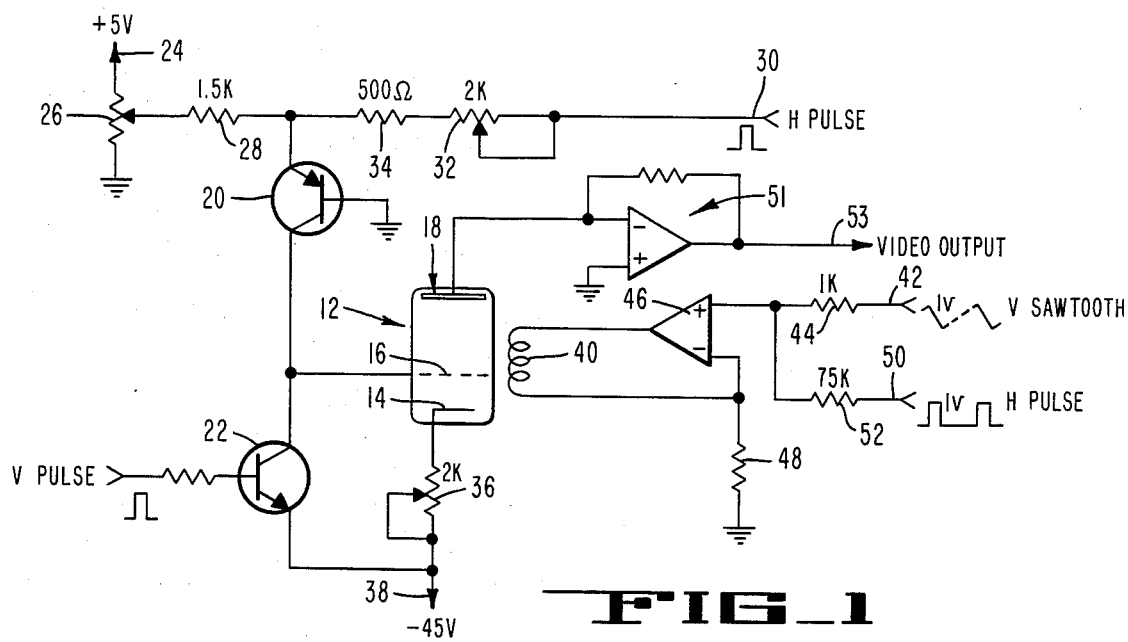
FIG_1
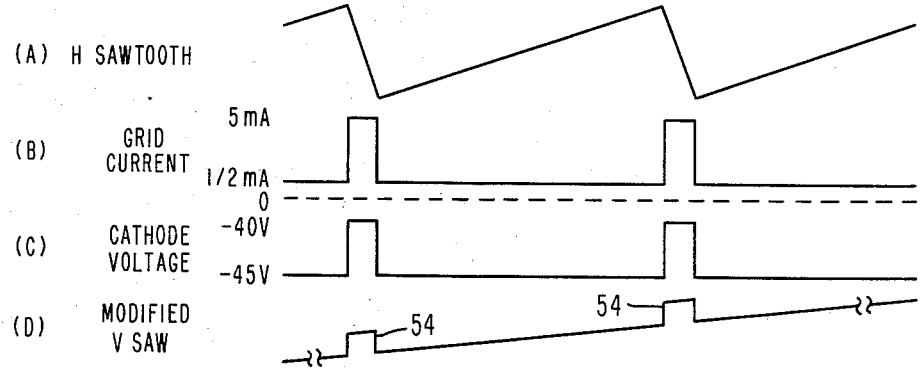
FIG_2
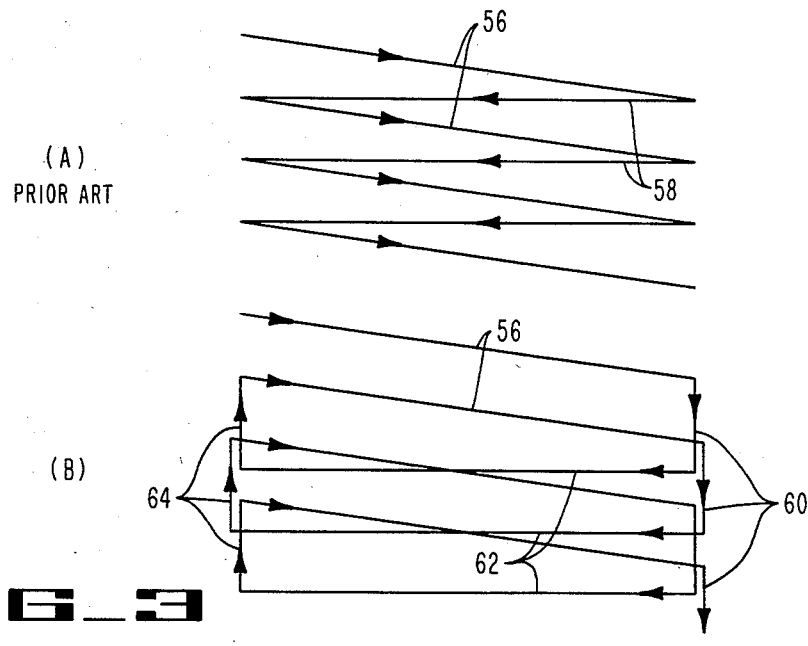
FIG_3

METHOD AND APPARATUS FOR AUTOMATICALLY CONTROLLING HIGHLIGHT EFFECTS

BACKGROUND AND SUMMARY OF THE INVENTION

In the field of color television, television cameras utilize image tubes such as for example vidicons, Plumbicons, Saticons, etc., as pickup tubes. Most successful of the tubes is the Plumbicon. A typical Plumbicon image tube utilizes a cathode connected to a −45 volt supply and a target on the face plate thereof, whereby during normal operation, light falling on the target causes the side of the target which is facing the cathode to charge positively towards ground potential. When the scanning beam reads off this part of the target, it attempts to discharge the target back towards the cathode potential, i.e., −45 volts. In the case of normal light levels falling on the target, the beam current available from the cathode is sufficient to discharge the target back down to −45 volts in one or two passes of the scanning beam. Thereafter, during the next field, the incoming light will charge the target back up toward ground potential again, whereupon the scanning beam will reduce the charge back towards −45 again on the next pass, etc.

However, when the incoming light falling on the target is radically increased, i.e., a condition known as a "high-light," the scanning beam has insufficient current to discharge the target back down to −45 volts in one pass of the scanning beam. If the camera is panned across a highlight, e.g., a very bright object, an image of the highlight, slowly decaying with time, will appear where the highlight was previously. Thus, several passes of the scanning beam are required to fully discharge the highlight area of the target back down to cathode potential. Simultaneously, however, signal current is being produced from the Plumbicon corresponding to the conventional video image. The result is a smearing of the image in the areas of the highlight, an effect known as "comet-tailing."

A related problem exists when there is insufficient beam current to fully discharge the target in one pass of the scanning beam, which is called "blooming." This occurs when the target area on which the highlight falls develops the large positive charge, whereby the electron beam is pulled towards the area far more rapidly than it should be by the attraction of the positively charged area on the negative electrons. Likewise, as the electron beam leaves the area, it is pulled back a little and tends to leave the area more slowly than it should. The effect of this condition is a time deformation of the image. For example, if the camera is imaging a small white square, it will actually appear as a larger white square on the television monitor. Blooming is also aggravated by the fact that the highly positively charged area of the target tends to bleed out charge in all directions away from the highlight due to leakage effects of the layer. This causes additional blooming around the outer regions of the highly positive area.

There are a number of potential solutions to the above problems of comet-tailing and blooming. In a first solution, the beam current from the cathode may be increased during the forward active picture scan to handle significant highlights. However, there are two disadvantages to this scheme. One disadvantage is that the resolution of the tube is greatly impaired by virtue of the fact that the beam profile becomes larger and is therefore incapable of resolving fine detail in the image. Secondly, the life of the pickup tube is greatly impaired, i.e., is reduced by a factor of two or three to one over what the expected life would be from a tube operated at normal beam current. For this reason, a compromise is made in selecting the normal value of the tube beam current which is small enough to allow adequate resolution to be obtained, yet large enough to allow reasonable highlight handling without greatly impairing the life span of the tube.

In an attempt to improve the highlight handling characteristics of the image tubes, another technique was developed involving a specially designed tube, commonly termed an "anti-comet-tail (ACT)" tube. The special tube includes an additional auxiliary grid of special configuration, and a cathode structure that allows a very large beam current to be generated in order to prevent the highlight effects. Relatively complex circuitry also is needed to support the tube and to drive the various control grids in order to handle the highlights. More particularly, during the normal horizontal retrace, i.e., the beam flyback scan, instead of turning the beam off, the beam is turned up to an extremely high level, i.e., hundreds of times normal beam current. To prevent damage to the tube by this excessively high current, the beam is heavily defocussed. This is performed by the auxiliary grid electrode to which is applied a suitable drive pulse. The result is that the flood of electrons covers many scanning lines and is less likely to damage the tube. The flood of electrons in turn discharges any areas of the target that are not normally discharged by the much lower value of beam current used during the forward scan.

To prevent the high current electron beam from reading out normal video images during retrace scans, the cathode potential of the tube was increased on the order of 7 volts above its normal −45 volt value, e.g., to −38 volts. Thus, the electron beam lands on any area of the target that is charged more positively than approximately −38 volts. It follows that by turning up the cathode voltage during the flyback scan, the beam electrons only land on parts of the target that have been affected by extreme highlights. It is to be understood that the values given above are by way of example only and correspond to average conditions where normal video signals give rise to charges on the target of the order of 6 or 7 volts peak-to-peak, such that the target varies from −45 to about −38 volts over a period of one field in response to a peak normal 100% video signal.

Various disadvantages exist in the special ACT tube and associated circuitry. For example, the resolution of the tube is inferior to that of a traditional Plumbicon tube. Secondly, the lifetime of the special tube is of the order of 30% less than the traditional Plumbicon tube. The latter condition is caused by the generation of X-rays in the vicinity of the target by the high velocity of the electron beam landing on the metallic grids of the electrodes of the special tube. Thus the use of ACT tubes for preventing the negative effects of highlights has never gained popularity.

In a further attempt to overcome the negative effects of highlights, a new approach for handling the beam during the forward, active picture scan was developed. In this scheme, the beam current in the tube is kept at a safe static value, except when a highlight appears on the picture. Then, during the forward scan, the beam current is suddenly increased to a value sufficient to discharge this highlight. As soon as the scanning beam passes the highlight area, the beam current again is decreased to its normal operating value. Thus, for example, when a highlight appears in the image, the beam current is normal until such time as the scanning beam reaches the highlight area. The video signal generated by the preamplifier coupled to the target will increase due to the highlight, and the increased signal is fed back to the grid of the tube. This in turn causes the beam current to increase to some large predetermined value, which allows the tube to successfully read out the highlight during the forward scan. As soon as the scanning beam passes the highlight area, the increased video signal vanishes and the grid voltage is reduced to normal value.

The latter beam control system suffers various disadvantages, the most notable of which is the fact systems like this have a very large tendency to oscillate. The reasons for oscillations are complicated, but suffice it to say that when the beam current is suddenly increased, the scanning beam is deflected from its normal path and may, for example, move up or down one or two lines of the picture. It follows that on the next pass of the scanning beam, the beam may read part of the image that it previously read, thereby generating a black line rather than a white line. The resulting pattern of dark and white lines looks very much like oscillation. Such oscillation may be minimized or eliminated by very careful and complex circuit design. But because of development trends in the portability, automation, etc., of broadcast quality television cameras, simplicity of design is a must if a competitive broadcast camera is to be provided.

Further disadvantages of the latter scheme arise due to the finite response time of the system, wherein the scanning beam must detect the highlight to cause the beam current to increase. Thus, very small speculars of highlight in the picture are passed by the electron beam before the system can respond to increase the beam current. Therefore, for example, if a small highlight such as generated by a piece of tinsel, a diamond earring, etc., is scanned, the system does not turn itself on in time to prevent the negative highlight effect. A further disadvantage of having a finite response time is that the leading edge of the highlight is not discharged properly in some cases. Therefore, if the camera is panned across a highlight, the leading edge of the highlight can actually bleed off and appear as a very short comet-tail. The above disadvantages can usually be overcome by increasing the response speed of the system. However, the faster the system is, the greater is the tendency for it to oscillate. And, as discussed above, such a beam control system, with feedback, of necessity includes relatively complex circuitry.

The disadvantage of having oscillation is compounded by the fact that different tubes of the same family, and/or of different sizes, have different characteristics. Thus, while the scheme may work on one particular tube, on another type of tube it may cause oscillation. In specific systems where the tube works well, frequent and critical adjustments of the cameras still are necessary in order to maintain the prevention of oscillation.

The present invention overcomes the shortcomings of the prior art by providing an automatic beam control system which provides the advantages, and none of the disadvantages, of all the above-mentioned beam control systems. In particular, the invention combines the advantages of the special ACT tube system which operates during the retrace (flyback) scan with the advantage of, automatic beam handling system with standard Plumbicon, Saticon, etc., tubes, which operates during the forward, active picture scan. The invention system utilizes the fact that standard pickup tubes, and particularly diode-gun Plumbicons, have considerable increased beam reserve, whereby the system circumvents highlight effects using a standard pickup tube. The system therefore does not require a special ACT tube and associated drive circuitry, or the complex automatic beam control system circuitry, but is, in fact, extremely simple to implement with a standard pickup tube.

More particularly, the invention system increases the beam current to the maximum possible value which can be handled by the tube during the horizontal retrace, while raising the cathode voltage a select amount to prevent readout of normal video information during the active picture scan. The latter feature is further optimized by modifying the scanning beam path during the retrace scan to positively insure that the image is scanned by the retrace scan beam prior to being scanned by the forward scan beam.

Accordingly, it is an object of the present invention to provide a very simple, automatic beam control system utilizing a standard Plumbicon, Saticon, vidicon, etc., image tube.

It is another object to provide an improved automatic beam control system which discharges excessive highlights during the rapid retrace scan period.

Another object is to provide an improved highlight supression system for a television pickup tube utilizing a modified retrace beam path.

Still another object is to provide a highlight suppression technique for television pickup tubes which insures that a given portion of the tube target always is scanned by the retrace scan beam prior to being scanned by the forward active picture scan beam.

It is still a further object to provide highlight suppression in a television camera via an extremely simple circuit which is totally free of instabilities inherent in prior art highlight suppression systems.

BRIEF DESCRIPTION OF THE DRAWINGS

FIG. 1 is a schematic diagram of an embodiment of the invention combination.

FIGS. 2A-2D is a graph of waveforms generated at various points of FIG. 1.

FIGS. 3A-3B are graphs showing the electron beam scan paths for the prior art and the invention combination, respectively.

DESCRIPTION OF THE PREFERRED EMBODIMENTS

FIG. 1 depicts an implementation of the invention combination, employing a standard television camera pickup tube 12 such as, for example, a Plumbicon, diode-gun Plumbicon, Saticon, etc. Only three elements in the tube are shown herein, and are of interest in the combination; i.e., a cathode 14, a single beam control grid 16 and a photoconducting layer defining a target 18. Note that only the single, standard, beam control grid 16 is required to provide the improved beam control in accordance with the invention combination; i.e., the system efficiently suppresses highlights with a standard pickup tube of longer life and optimum resolution, without requiring the complexity of a special ACT tube with extra auxiliary grid and associated drive/control circuitry.

The collector of a current source transistor 20 is coupled to the grid 16, as well as to the collector of a blanking transistor 22. Thus any control current from the transistor 20 flows directly to the control grid 16 of the tube 12, to provide the beam current. The control current includes a main beam control current and a beam pulse current.

The main beam control current is provided via a voltage source at 24 (+5 volts) coupled to a potentiometer 26, to a resistor 28 and thence to the emitter of the current source transistor 20. The base of the latter is grounded. The main beam current is selectively adjusted via the potentiometer 26 in conventional manner by opening the iris of the camera (not shown) to provide 200% of normal video. Then the potentiometer 26 is adjusted to provide a beam current value which just discharges the image on the tube.

The beam pulse current is provided by applying a horizontal pulse, e.g., horizontal drive pulses of +5 volts as at 30, to the emitter of transistor 20 via a potentiometer 32 and resistor 34. Thus the beam pulse current is applied during the horizontal retrace scan period, and the value is adjusted by potentiometer 32 to provide the maximum possible beam current during the retrace scan.

Increasing the beam current during retrace can cause problems in that the beam can read off those areas of the video signal image on the target 18 which are below 100%. This condition can have unpleasant effects on the video image. To prevent this condition, the cathode potential of the tube is raised from the normal operating value of −45 volts during the active picture scan, to a value on the order of −40 volts during the retrace scan. The +5 volts change on the cathode 14 is due to the fact that ⅔ inch Plumbicons typically develop a 5 volt charge image on the target in response to normal video signals less than 100%. It follows that if the cathode potential is raised to −40 from −45 volts, the electron beam cannot fall on the normally charged areas of the target, and therefor cannot erase them. The electron beam can, however, fall on areas of the target which are charged more positively than 100% due to the action of highlights.

In accordance with the invention combination, the cathode potential is raised as discussed above by coupling a single variable resistor 36 directly between the cathode 14 and a −45 volt supply, as at 38. The pulse of grid current initially is provided to the cathode 14. Therefore, as the cathode current increases from some nominal value of, for example, ½ milliamp (mA) to a peak value of 5 mA, there will be a change of voltage across the cathode resistor 36 which raises the cathode voltage. For example, if variable resistor 36 is set at 1,000 ohms, and the normal beam current is ½ mA, then normally there is ½ volt developed across the resistor and the cathode potential during active picture scan is −45.5 volts (i.e., in the region of −45 volts).

However, during the horizontal retrace scan, the cathode current increases to 5 mA by virtue of the grid current pulse at grid 16, and the voltage developed across the 1,000 ohm resistance increases to 5 volts. Hence the cathode potential is raised to the order of −40 volts which precludes the beam from landing on the normally charged areas of the target, as discussed above. Thus the single resistor 36 effectively pulses the cathode 14, wherein the magnitude of cathode pulse is adjusted by the setting on the resistor 36.

The blanking transistor 22 is conventionally saturated during the vertical retrace period, and therefore connects the grid 16 to the −45 volts supply 38, thus preventing any beam current from flowing. This prevents readout of the image as the scanning beam moves from the bottom to the top of the picture to begin the next field scan.

A conventional vertical scan coil 40 for determining the vertical movement of the electrom beam, is shown coupled to a source 42 of vertical sawtooth waveform via a resistor 44 and the positive input of an amplifier 46. Thus the sawtooth current flowing in the scan coil 40 is sensed by a resistor 48 and is applied as feedback to the inverting input of the amplifier 46. This causes the current through the resistor 48 to be a faithful replica of the sawtooth applied via input 42, which provides a predictable vertical sawtooth current through the scan coil 40.

In addition, horizontal pulses (e.g., horizontal drive pulses) are supplied to the positive input of the amplifier 46 via a source 50 and a resistor 52 and thus are mixed with the normal vertical sawtooth. The ratio of the resistances 44, 52 are selected such that the pulses have a one to two percent amplitude at the amplifier positive input, compared to the amplitude of the actual scanning sawtooth at 42. Thus resistors 44, 52 may be of the order of 1K and 75K ohms respectively. The horizontal pulses at 50 are precisely coincident in time with the horizontal retrace period, as further discussed in FIG. 2.

It may be seen that addition of the pulses of selected amplitude with the sawtooth at 42, positively insures that the scanning beam is moved down the field a corresponding one or two percent before performing each retrace scan. The scan path and effects thereof are further discussed below.

The target 18 is coupled to the input of an operational amplifier 51, which is the camera video preamplifier. Due to the feedback resistor the target is coupled to ground. Video is provided at output 53.

FIG. 2 illustrates waveforms which help clarify the operation of the circuit depicted in FIG. 1. FIG. 2A depicts a waveform of a normal horizontal scanning sawtooth as applied to the tube via a horizontal scan coil (not shown). The slowly increasing positive-going portion corresponds to the normal active picture beam scan from left to right across the image. The more rapid, negative-going portion of the sawtooth corresponds to the retrace scan back across the image. FIG. 2B depicts the beam current waveform used with the invention combination. The dotted line indicates the zero reference datum. During the active picture scan, the beam current has a typical static value, shown here, for example, as ½ mA. When the beam is retracing, the beam current of FIG. 2B increases to a preselected fixed high value shown here, for example, as 5 mA. Thus FIG. 2B depicts the waveform of the current flowing in the grid 16. The actual beam current which this generates will have the identical waveform, but is normally a very small fraction of the actual cathode current, as is known in the art. FIG. 2C depicts a waveform of the cathode voltage of tube 12. During active picture scan the voltage is at −45 volts, and is raised to −40 volts, i.e., the "raised level", during the retrace scan to preclude the beam from landing on the normally charged areas of the target.

FIG. 2D depicts the vertical sawtooth waveform modified in accordance with the invention combination. Since the sawtooth continues over several hundred lines, FIG. 2D only shows a section of the sawtooth; i.e., two lines. Also, obviously, the waveforms of FIG. 2 are not to scale. The waveform depicts (FIG. 2D) however, the addition of the one or two percent horizontal pulses 54 to the sawtooth during the retrace scan. The pulses 54 are in the same direction as the increasing sawtooth, and cause the beam to scan further down at the beginning of the retrace scan period, and then back up at the end of the retrace scan period to a point where the beam should be in the course of the normal horizontal retrace. The pulses 54 were herein set at two percent of the normal vertical sawtooth amplitude. Since there are about 250 lines in the normal vertical scan, it follows that in this exmple, the pulses 54 cause the electron beam of tube 12 to deflect down on the order of five lines, and back up five lines. Obviously the magnitude of the pulses 54 may be other than one or two percent depending upon the number of lines to be dropped during retrace.

Thus in accordance with the invention combination, it is absolutely assured that the horizontal retrace scan, i.e., the retrace beam reading action, always occurs prior to the normal active picture scan, i.e., the normal reading action.

FIGS. 3A, 3B further illustrates the above discussed modified retrace scan path. FIG. 2A depicts a conventional scanning pattern typical of all types of pickup tubes, and well known to those skilled in the art. The pattern is shown here highly exaggerated for reasons of clarity; the space between the lines, and the slopes of the lines, are shown much greater than is the case in practice. Basically, the active picture scan paths 56 have a given downward slope due to the fact that the beam is gradually being pulled at a constant rate downward by the action of the vertical scan. However, the slope of the retrace scan path 58 is much less because the beam retraces in a much shorter time and therefore is pulled down by a much lesser amount by the vertical scan action.

In the modified scan path of FIG. 3B, the active picture scan path 56 remains as in FIG. 2B. However, at the end of the active picture scan period, instead of retracing immediately back to the left, the beam scan path is forced down several television lines (herein depicted as only one line for clarity) as shown at 60, by the application of the horizontal pulse 54 (FIG. 2D) to the vertical sawtooth, as shown in FIG. 1. Then the beam begins the retrace scan along a retrace scan path 62 which is located several lines below the normal retrace scan path. At the end of the retrace scan, when the beam is at the left side of the image, the beam is suddenly moved back up the same number of lines that it was previously moved down, as shown at 64. The beam is now ready to begin the next active picture scan.

The modified scan path guarantees that the retrace scan beam always reads out video prior to the arrival of the normal active picture scan beam at that area of the target, i.e., image. That is, the retrace beam, which is the highly amplified beam pulse, discharges any given area of the target prior to the normal active scan beam arriving at that area. Although it may appear from FIG. 3A that the same condition exists, as previously mentioned, the scan paths are highly exaggerated and the beam in reality is very much wider in relation to the path width, and may well overlap the scanning lines to some extent. Also, coupling to the vertical coil can occur during the rapid pulses of the horizontal scan coil during retrace, which at times may cause the beam not to retrace in the exemplary manner shown in FIG. 2A. These scanning exceptions prevent the optimum, stable suppression of highlights.

More particularly, assume that a normal video signal charges the target 18 five volts above cathode potential, and that there is sufficient beam current available to actually discharge the target by 10 volts during a normal active picture scan. Then assume a highlight in the picture that charges the target to, for example, 20 volts above the cathode potential. In the prior art scan (FIG. 3A) it is possible, and does happen, that the normal picture scan beam reads out the image prior to the retrace scan beam. Thus, with a 20 volt charge on an area of the target, if the normal picture scan beam arrives first, it is capable of reducing the charge from 20 down to 10 volts. Now the retrace scan beam arrives and is only capable of discharging the 10 volts left down to only five volts, because the cathode potential has been raised by five volts to preclude the beam from landing on normally charged areas of the target. Thus, in the area of the highlight, the scanning beam has left behind a five volt charge, i.e., has not fully suppressed the highlight.

Now in accordance with the invention combination, assume again the conditions above with a target charge of 20 volts due to a highlight. Now the retrace scan beam arrives first (FIG. 3B) and generally has sufficient power to discharge the target by, for example, 13 volts, down to seven volts. Next the active picture scan beam arrives with the capability of discharging by 10 volts. Since there are only seven volts remaining on the highlight area of the target, the latter beam reads it out completely, i.e., the highlight is fully suppressed while the image is read out.

It is to be understood that the invention combination requires a high speed scanning system, i.e., a scanning system which can be deflected at high speeds, in order to properly respond to the horizontal pulse 54 applied to the vertical sawtooth. Also, the use of the invention combination of the beam pulse current and raised cathode voltage in itself provides improved highlight effects suppression.

I claim:

1. A circuit for suppressing highlight effects, comprising;

an image tube having a single control grid, a cathode and a target;

current source transistor means coupled to the single control grid;

a main beam control source coupled to the transistor means;

a horizontal pulse source for generating a superimposed grid pulse also coupled to the transistor means;

resistive means coupled to the cathode and responsive to the superimposed horizontal grid pulse for sufficiently raising the cathode voltage during the retrace scan to prevent readout of the normal video portions while allowing discharge of the highlight portions of the target; and means coupled to the tube for insuring that the retrace scan arrives at given areas of the target prior to the arrival at the area of the active picture scan.

2. The circuit of claim 1 wherein the means coupled to the cathode include;

variable resistor means directly coupled to the cathode; and voltage source means of the order of −45 volts coupled to the variable resistor means.

3. The circuit of claim 1 wherein the means for insuring include;
vertical scan coil means integral with the tube;
vertical sawtooth source means operatively coupled to the vertical scan coil means; and
horizontal pulse source means operatively coupled to the vertical scan coil for adding horizontal pulses of the same polarity to the vertical sawtooth during each successive retrace scan.

4. A circuit for suppressing highlight effects comprising:
an image tube having a single control grid, a cathode and a target having stored therein charged portions of normal video and highlights;
means integral with the tube for generating horizontal active picture and retrace scans;
grid control means including means for superimposing a horizontal grid pulse to increase the current to the single control grid to a preselected maximum of the order of five milliamps during the retrace scan; and
resistive means coupled to the cathode and responsive to the superimposed horizontal grid pulse for sufficiently raising the cathode voltage during the retrace scan to prevent readout of the normal video portions while allowing discharge of the highlight portions of the target.

5. A method for controlling highlight effects in a standard television camera tube having a single control grid, a cathode for generating an electron beam and a target which is scanned by the electron beam during the successive horizontal active picture scan periods and respective alternate horizontal retrace scan periods, comprising;
supplying the single control grid with grid control current during the horizontal active picture scan periods;
superimposing a current pulse on the single grid control current during the horizontal retrace scan periods;
applying a voltage to the cathode during the horizontal active picture scan periods to readout normally charged portions of the target; and
applying a raised voltage to the cathode in response to the superimposed current pulse on the grid, of a value sufficient to prevent the electron beam landing on the normally charged portions of the target during the horizontal retrace scan periods.

6. The method of claim 5 further including;
scanning a given area of lines on the target with the retrace scan beam during the retrace scan periods prior to scanning the same given area with the subsequent active picture scan beam.

7. The method of claim 6 wherein the step of scanning comprises;
supplying a vertical sawtooth waveform; and
applying horizontal pulses of given magnitude and with the same polarity to the vertical sawtooth waveform during the horizontal retrace scan periods.

8. A circuit for suppressing highlight effects in a standard image tube having a single control grid, a cathode for providing an electron beam, and a target having over-charged portions due to the highlights as well as normally charged portions and which are scanned by the electron beam during active picture scans and retrace scans, comprising;
means coupled to the single control grid for increasing the grid current thereof to a maximum during the retrace scans; and
means coupled to the cathode and responsive to the increase in grid current for raising the cathode voltage to a value sufficient to prevent the electron beam from landing on the normally charged portions of the target while allowing the beam to land on the highlight portions thereof during the retrace scans.

9. The circuit of claim 8 further including;
means integral with the tube for generating the active picture and retrace scans in the vertical and horizontal directions; and
means coupled to the means for generating scans for stepping the retrace scan down a distance at the beginning of the retrace scan period which insures that the retrace scan defines a path prior to the subsequent normal active picture scan path, and for stepping the retrace scan back the same distance at the end of the retrace scan period.

10. The circuit of claim 9 wherein the means coupled to the cathode include;
a negative voltage source; and
a single variable resistance coupled from the negative voltage source to the cathode.

11. The circuit of claim 9 wherein the means for stepping include;
horizontal pulse source means for providing horizontal pulses during the retrace scan which have a magnitude of the order of at least one percent of the magnitude of the vertical scan; and
means for adding the horizontal pulses to the vertical active scan during respective horizontal retrace scans.

* * * * *